United States Patent [19]

Sgourakes et al.

[11] 4,088,020

[45] May 9, 1978

[54] VORTEX FLOWMETER APPARATUS

[75] Inventors: George E. Sgourakes, Millis, Mass.; Robert C. McCullough, Cumberland, R.I.

[73] Assignee: The Foxboro Company, Foxboro, Mass.

[21] Appl. No.: 777,210

[22] Filed: Mar. 14, 1977

[51] Int. Cl.$^2$ .............................................. G01F 1/32
[52] U.S. Cl. ................................................ 73/194 VS
[58] Field of Search .................................. 73/194 VS

[56] References Cited

U.S. PATENT DOCUMENTS

| 3,732,731 | 5/1973 | Fussell, Jr. | 73/194 |
| 3,796,095 | 3/1974 | Fussell, Jr. | 73/194 |
| 3,823,610 | 7/1974 | Fussell, Jr. | 73/194 |

Primary Examiner—Herbert Goldstein
Attorney, Agent, or Firm—Andrew T. Karnakis

[57] ABSTRACT

A vortex flowmeter in which the vortex-shedder and the vortex sensor comprise two distinct, easily separable assemblies that may be readily removed and/or assembled from the interior of a flow conduit. The sensor is housed in a body fixedly suspended within the conduit by an integrally connected support structure extending outwardly through an opening in the conduit wall. The shedder comprises a blunt front face extending across the interior of the conduit for producing vortices and a bar-member joined to the front face and extending downstream therefrom defining an area for detecting the vortices. The bar-member is formed with a lateral recess that matches the pattern of the sensor and support structure such that when the shedder is positioned to engage the sensor, the overall bar-member configuration is preserved to assure good measurement results. Outside of the conduit, the support structure is securely fastened to the conduit so as to firmly hold the sensor within the shaped recess. There is also disclosed means for properly locating the position of the front face with respect to the direction of flow during assembly of the flowmeter.

10 Claims, 6 Drawing Figures

VORTEX FLOWMETER APPARATUS

BACKGROUND OF THE INVENTION

1. Field of the Invention

This invention relates generally to apparatus for measuring the flow of liquids or gases. More particularly, this invention relates to flowmeters of the vortex-shedding type, and to improvements in construction thereof.

2. Description of the Prior Art

It is well known in the art that vortices are developed in a fluid flowing past a bluff body or other suitable non-streamlined obstruction, and that with the use of certain configurations, the vortices shed at regular intervals from the edges of the obstruction to form a row of vortices, commonly referred to as a Von Karman "vortex street". Furthermore, it is well established that the spacing between successive vortices is essentially constant over a range of flow rates; therefore, the frequency of vortex formation is proportional to the velocity of the fluid. Thus, the fluid flow rate may be measured by sensing the frequency of vortex formation.

Various designs have been proposed for sensing the vortices downstream from the bluff body. A technique that has met with significant success is shown in U.S. patent application Ser. No. 639,776, filed by J. R. Curran et al on Dec. 11, 1975, and assigned to the same assignee as the present application. In that Curran application, a bar-like member having flat, parallel side surfaces is located downstream of the blunt front face of the vortex-shedding body. Within these side surfaces is formed an interior chamber containing a vortex sensor (e.g., a piezo-electric ceramic disc) sealed from the process fluid by flexile diaphragms at both side surfaces. The bar member is integrally joined to the vortex-shedding body such that the side surfaces of the bar-member are aligned with the direction of flow. This "shedder" apparatus thus comprises a bluff body with sharp side edges adapted to produce spaced rows of vortices and downstream thereof, a bar member housing the vortex sensor. The overall structure (i.e., shedder and sensor) forms part of an elongate, integral meter member which is insertable through an opening in the top of a pipe section for the purpose of measuring flow rate in the pipe.

Such prior design techniques in which the vortex sensor and the shedder are so physically interconnected as to form an integral unit have not been fully satisfactory in all applications. For example, when measuring the flow rate of corrosive liquids or gases, such configurations require that the entire metering structure be made from a non-porous, corrosive resistant material such as stainless steel. This type of construction results in increased manufacturing costs due in part to the cost of raw materials involved, and also due to the extensive machining required to shape the structure so as to effectively shed and detect vortices over a wide range of flow rates. In addition, such integral vortex-shedders/sensors have significant impact upon development costs associated with laboratory check-out of units prior to sale. Since the best way to measure the performance of the flowmeter is by testing completed units, the failure of a vortex sensor under test may, in some instances, require the discarding of the shedder together with the sensor, or, at the very least, extensive factory rework of the unit, including precision realignment of new components.

Also, an integral shedder/sensor unit generally requires a relatively large cut-out in the pipe wall to allow for the units insertion. This can create problems in effecting good pressure-tight sealing under certain conditions.

Still another factor is that, in most industrial instrumentation applications, field maintenance is becoming increasingly more significant to reduce outage of measurement capability. When field failures of an integral shedder/sensor vortex flowmeters occur, most often the device must be transported to a field maintenance depot for repair. Such depots may be a considerable distance from the installation site so that the affected unit may be away from its site for a prolonged period of time. Therefore, it is desireable to provide for rapid repair at the site, or quick replacement to minimize downtime.

SUMMARY OF THE INVENTION

The present invention overcomes the foregoing disadvantages and limitations of prior vortex meters by providing a flowmeter in which the vortex-shedding body and vortex sensor comprises two distinct, easily separable assemblies. The sensor is housed in a body which is fixedly suspended within the pipe by an integrally connected support structure that extends outwardly through an opening in the pipe wall. The shedder comprises a blunt front face extending across the interior of the pipe for producing spaced sets of vortices and a bar-member of predetermined cross-section extending downstream from the front face and rigidly joined thereto, which forms an area for detecting the shed vortices. The overall shedder is rotatable about the pipe axis, and the bar-member is formed with a recess opening out laterally through one of the sides. This recess is shaped to match the pattern of the sensor-body such that when the shedder is swung into position to engage the sensor, the overall bar-member configuration is preserved to assure good measurement results. Outside of the pipe, the support structure is securely fastened to the pipe, thereby holding the sensor firmly within the shaped recess. Conversely, loosening of the support structure allows the shedder to be shifted away from the sensor, thereby accommodating ready removal of either assembly from the interior of the pipe.

This unique construction of the present vortex meter in which the sensor and the vortex shedder are comprised of modular, easily separable components affords manufacturing savings by permitting the entire shedder to be formed from a simple, relatively inexpensive casting of porous material that requires little machining to provide well defined vortex shedding/sensing regions. Correspondingly, only the sensor need be assembled in a high corrosion-resistant, non-porous material that is hermetically sealed from the process fluid.

The separation of critical component parts provides for the ability to repair such components at a relatively low cost and under field conditions. In addition, the flowmeter is assembled from within the pipe for external instrument interface, thereby significantly reducing the pipe opening required for insertion of the vortex shedder/sensor and thus reducing the effective area for which pressure sealing is required. Difficulties associated with the alignment of the vortex shedder front face with respect to fluid flow have also been overcome by the unique means in which component parts are configured for assembly.

Accordingly, it is a principal object of the present invention to provide a superior vortex flowmeter that is constructed of modular components that are readily assembled, properly aligned, and repaired at a low cost. Other object of the invention will be pointed out in, or apparent from, the following written description considered together with the accompanying drawings.

DETAILED DESCRIPTION OF THE INVENTION

Figure 1:
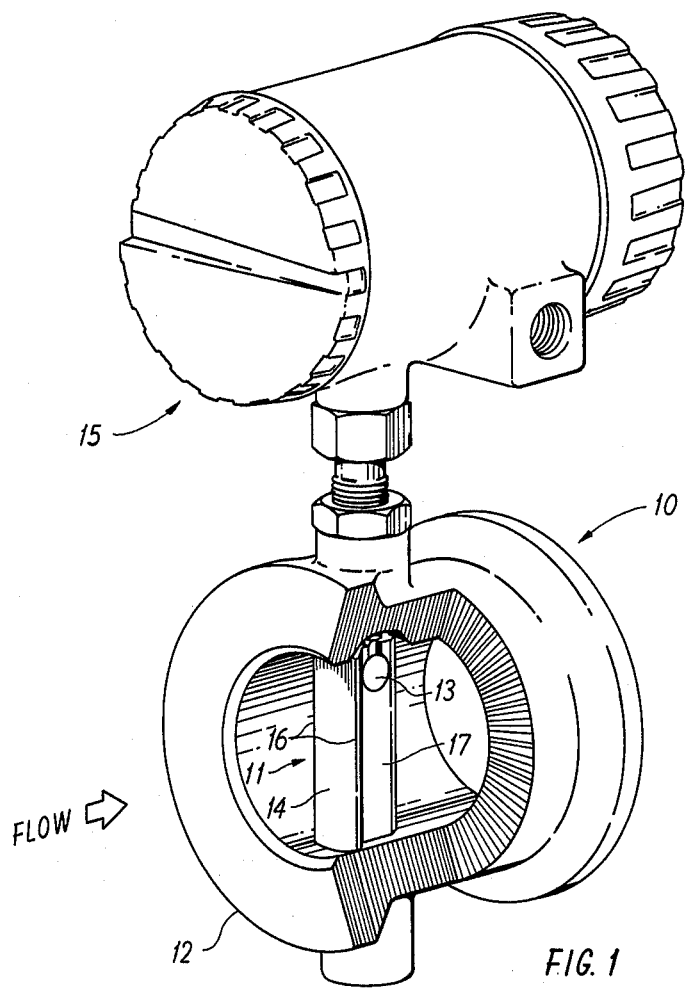
FIG. 1 is a perspective view of a vortex flowmeter embodying one form of the present invention, partially cut away to show the location of the sensor body within the vortex-shedder.
Figure 2:
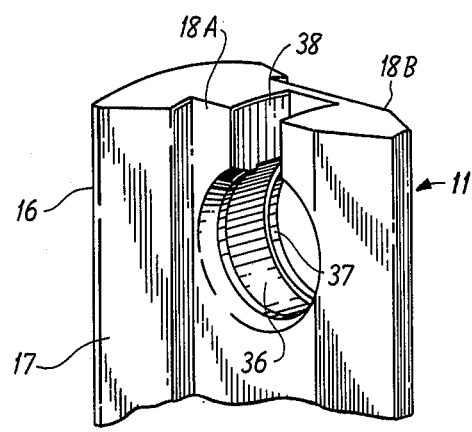
FIG. 2 is a perspective view of the vortex-shedder looking upstream to the direction of flow, showing the lateral recess in which the sensor body is positioned.
Figure 3:
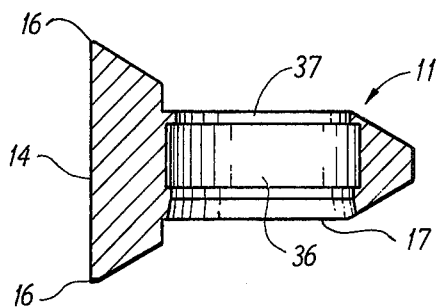
FIG. 3 is a horizontal section through the lateral recess of the vortex-shedder outlining the predetermined cross-sectional shape in the area of vortex sensing.

Referring now to FIGS. 1–3, a vortex flowmeter 10 is shown to comprise a vortex-shedding body (i.e., shedder) 11 extending substantially across the diameter of a section of pipe 12 and a vortex sensor 13 positioned within the shedder downstream from its front face 14. An instrument housing 15 coupled to the top of the pipe contains electronic circuitry for converting the frequency of shed vortices into a conditioned pulse or optionally an analog signal representative of the flow rate. The frequency conversion circuitry does not form part of the present invention and may be of the type described in U.S. Pat. No. 3,948,098.

The shedder 11 includes a bar-member 17 rigidly joined to the front face 14 such that the bar-member's parallel side surfaces 18A, 18B are perpendicular to the front face. With the front face perpendicular to the direction of flow (i.e., side surfaces aligned with the flow), rows of alternating spaced vortices are generated along the sharp lateral edges 16 of the front face as flowing fluid impinges on the shedder. These vortices are detected by a sensor 13 positioned within the bar-member. It is desireable in vortex flowmeters having sensors located downstream from the vortex-shedding region to maintain a substantially uniform cross-sectional area in the sensing region so that spurious pressure pulses are not produced which would affect the accuracy of the metering device. The construction of the bar-member of the present invention such that it perserves this uniformity in the sensing region will be discussed subsequently.

The sensor 13 may be of any known type that generates an electrical signal in response to the pressures devleoped by the shed vortices, as for example, a disk of piezoelectric material. The construction of this type of sensor is more fully described in the aforementioned Curran application. In the present flowmeter, the sensor is packaged in a shallow cylindrical sensor-body 19. Integral with the body is a support arm 20 that extends through an instrument access opening 22 in the top of the pipe. The support arm also serves as a conduit for the electrical connection between the sensor and frequency conversion circuitry. The support arm is securely fastened to the exterior of the pipe by a mounting sleeve 25 adapted to slide over the support arm. This sleeve comprises a ferrule 26 coupled to one end of a hollow-center bolt 27 such that when the bolt is tightened the ferrule is squeezed between the pipe wall and the support arm, thereby providing a pressure-tight, rigid bond therebetween. Prior to final tightening of the mounting sleeve, the sensor-body is positioned with its flat sides aligned with the direction of flow. These flat sides contain diaphragms 23, 24 which transmit the pressure pulses to the sensor.

Figure 4:
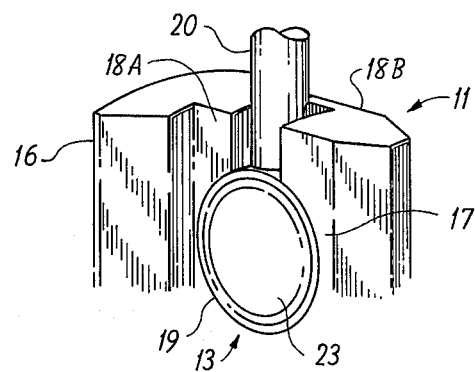
FIG. 4 is a perspective view of the vortex-shedder of FIG. 2 with the sensor positioned with the lateral recess, showing the retention of the predetermined shape.

As previously discussed, the vortex-sensor is a distinct assembly that is readily removable from the vortex-shedder. To facilitate the separability of components without degrading the performance characteristics of the flowmeter, the bar-member 17 is formed with a uniform circular stepped recess 36 that opens outwardly through both side surfaces 18A, 18B. This dual opening provides capability of sensing alternating pressure variations so that the sensor 13 generates a well defined alternating measurement signal. A slotted recess 38 extends the stepped recess through the end of the bar-member adjacent the opening 22. These combined recesses are shaped to match the pattern of the sensor-body 19 and the support arm 20 such that when they engage the recesses, the uniformity of the aforementioned predetermined cross-section is retained (see FIGS. 3, 4). The lip 37 of the stepped recess constrains any further displacement of the bar-member after insertion of the sensor/support arm that would disrupt the uniformity of the cross-section within the vortex sensing region.

Figure 6:
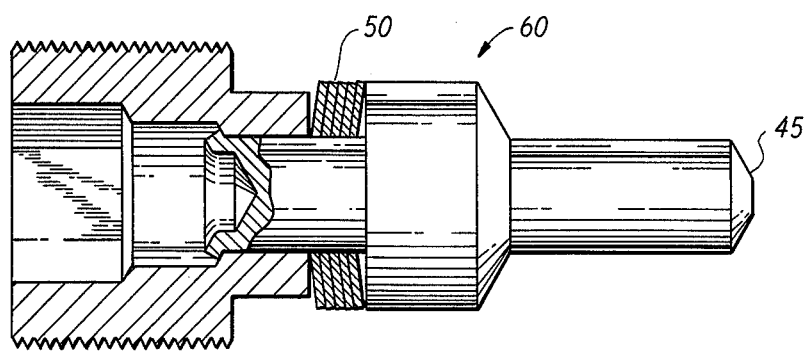
FIG. 6 is a sectional view of an alignment plug used in connection with the flowmeter of FIG. 1.
Figure 5:
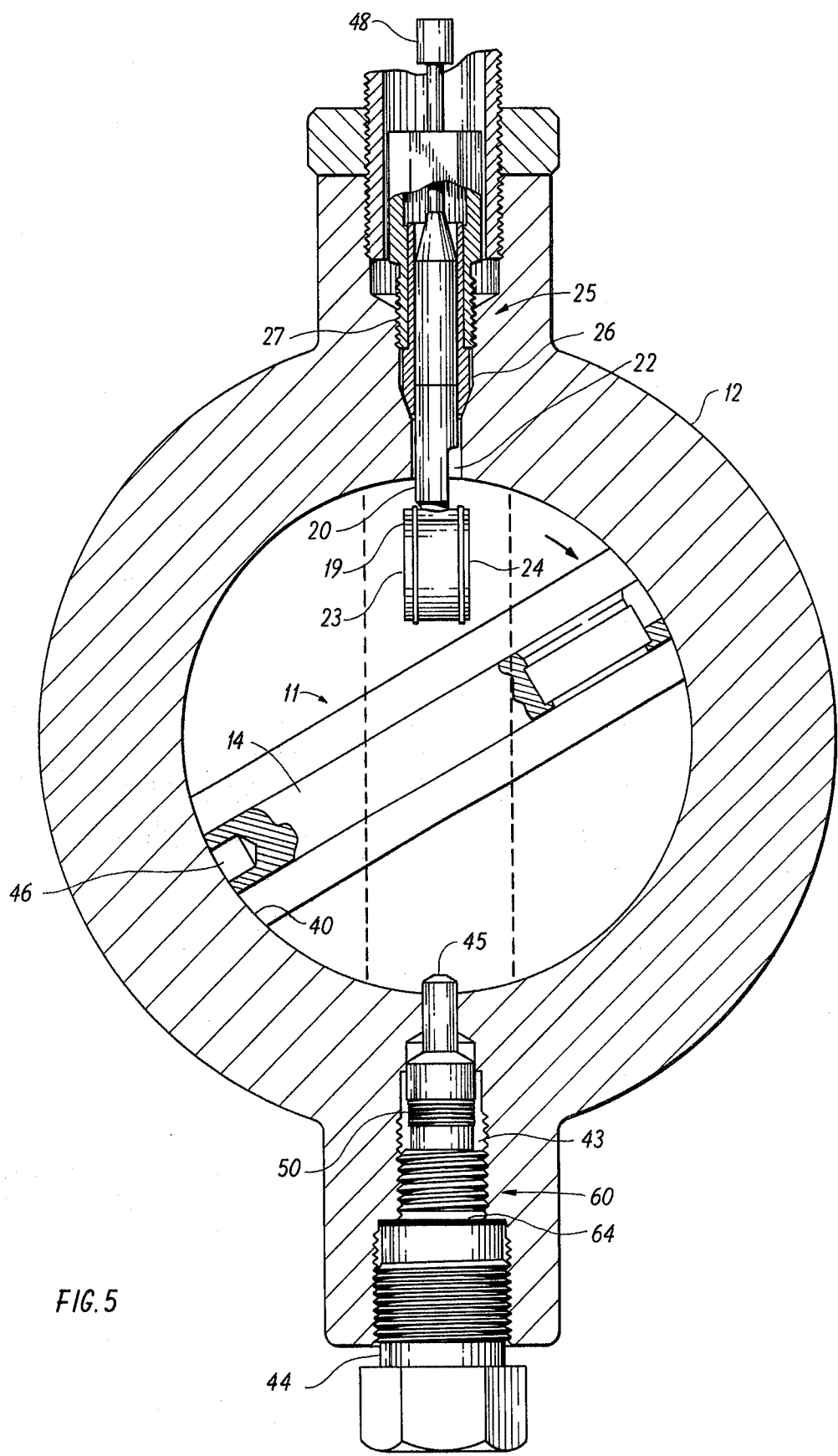
FIG. 5 is a cross-section of pipe showing the removal of the vortex-shedder from the sensor.

Turning now to FIG. 5, the front face 14 of the shedder 11 includes curved ends 40, 42 whose radius is substantially the same as that of the interior of the pipe. Thus the shedder is both rotatable about the pipe axis as well as movable along the axis while maintaining contact with the pipe wall at its (i.e., the shedder's) opposite ends. When the shedder is assembled to the sensor-body 19, a clamp screw 60 (see FIG. 6) extending through a second opening 43 in the pipe co-axially opposite the instrument access opening 22 engages the end 40 of the shedder, thereby preventing the shedder from shifting away from the sensor-body. The combination of the clamp screw and the curved end 42 of the shedder also provides proper alignment of the shedder within the pipe, a feature which will be discussed in more detail subsequently below. The threaded plug 44 and gasket 64 form an effective pressure seal.

To demonstrate the ease with which the shedder and sensor may be disengaged from each other and from the pipe itself, the plug 44 and gasket 64 are first removed and then the clamp screw 60 is released until the shedder is free to rotate away from the sensor. When the shedder is rotated sufficiently such that its slide edge 16 clears the sensor-body 19 (FIG. 5), the entire shedder may be slid out one end of the pipe. Unfastening the mounting sleeve 25 and disconnecting an electrical connector 48 permits the sensor/support arm structure to be lowered into the pipe for removal similar to that as for the shedder. Assembly of the shedder and sensor is initiated from the inside of the pipe and is carried out by simply reversing the steps outlined above.

Proper alignment of the shedder (i.e., front face perpendicular to the direction of flow and longitudinal axis of shedder centered on the longitudinal axis of the pipe) improves the quality and regularity of shed-vortices. Whereas in integral vortex flowmeters, alignment of the shedder is permanently set during manufacturing by carefully welding the shedder in its proper position, the unique design of the present meter with its modular, removable components requires only simple adjustments to assure proper alignment when the unit is assembled either in the factory or in the field. Referring once again to FIG. 5, the clamp screw 60 includes a tapered end 45 which is adapted to fit into a matching recess 46 in the shedder when it is engaged with the sensor. As the plug is tightened, the tapered end is driven into the recess, thereby producing a camming effect between the curved end 42 of the shedder and the interior radius of the pipe which then properly aligns the shedder with respect to the pipe.

Although the tapered end 45 and the clamp screw 60 form a captive assembly (FIG. 6), each is free to rotate with respect to the other. Thus if the tapered end were to be "frozen" tightly to the shedder as a result of a corrosive reaction or bonding with the process fluid, the clamp screw, whose threads are removed from the process interface within the walls of the pipe, could easily be unscrewed, eventually withdrawing the tapered end from the shedder. To assure that the alignment remains true over the operating temperature extremes of the meter, a compression spring 50 provides a preloading effect which accommodates thermally induced length changes, thereby keeping the clamp screw fixedly engaged with the shedder.

The overall configuration of the present invention with its modular component design provides the ability to assemble the shedder/sensor for measuring flow rate from the interior of the pipe. This technique is particularly advantageous because it substantially reduces the size of external openings required in the pipe wall. Under conditions of high process fluid pressure, such reduced openings may be effectively sealed without the addition of cumbersome structural retaining members that provide a sufficient force to offset the high process pressure. For example, a three inch flowmeter embodying the present invention requires only an opening in the order of a ¼ inch diameter for assembling the sensor and shedder within the pipe. Such a small opening can be properly sealed for high pressure applications by means of a simple ferrule/bolt assembly as discussed in detail above.

Although a specific embodiment of the present invention has been set forth in detail above, this is for the purpose of illustration only and should not be considered as limiting for it is to be understood that numerous variations may be made by those skilled in the art without departing from spirit of the invention as set forth in the accompanying claims.

We claim:

1. Flowmeter of the vortex-shedding type, comprising:
    a conduit for carrying a flowing fluid, said conduit having an opening through one wall;
    a vortex-shedding body extending substantially across the interior of said conduit;
    said vortex-shedding body having a front face producing spaced sets of vortices;
    said vortex-shedding body further including a bar-member joined to said front face and located downstream thereof, said bar-member having two side surfaces positioned within said spaced sets of vortices for receiving pressure variations produced thereby;
    said bar-member having a recess opening out laterally through one of said side surfaces and the adjacent end of said bar-member;
    a vortex sensor positioned in said recess to sense through said lateral opening said pressure variations;
    a support structure integral with said sensor within said recess and extending through said end opening and through said conduit opening;
    means outside of said conduit for securing said support structure to said conduit, thereby firmly holding said sensor and said support structure within said recess;
    said recess being formed to receive said sensor and said support structure such that at least in the area of said bar-member containing said sensor no spurious pressure pulses are produced that would affect the accuracy of said flowmeter;
    said lateral opening of said recess enabling said bar-member to be disengaged from said sensor and support structure by relative movement of said bar-member with respect to said sensor, whereby ready removal of said bar-member facilities replacement of either said bar-member or said sensor and support structure from the interior of said conduit.

2. Apparatus as claimed in claim 1 wherein said conduit comprises a pipe;
    said bar-member being disengaged from said sensor by rotational movement of said bar-member about the central axis of said pipe.

3. Apparatus as claimed in claim 2 including means for removing said sensor and support structure from said flowmeter through the interior of said pipe.

4. Apparatus as claimed in claim 3 wherein said securing means for said support structure includes means for sealing said conduit opening from the pressures developed by said flowing fluid.

5. Apparatus as claimed in claim 4 wherein said sealing means is a ferrule.

6. Apparatus as claimed in claim 2 wherein said lateral opening of said recess extends through to the other side surface of said bar-member forming a uniform stepped recess therein, whereby said sensor may be arranged to sense alternating pressure variations produced by said sets of vortices while still being firmly held within said recess.

7. Apparatus as claimed in claim 2 wherein said pipe includes a second opening located coaxially opposite said firstmentioned opening;
    said shedder being formed with curved ends of radius substantially equal to the radius of the interior of said pipe;
    adjustable means insertable within said second opening for locating the position of said front face with respect to the direction of flow, whereby when said position locating means is tightened a camming effect is produced between said curved ends and said pipe interior that aligns said front face substantially perpendicular to the direction of flow.

8. Apparatus as claimed in claim 7 wherein said position locating means comprises a rigid member adapted to engage one end of said shedder;

a clamp screw coupled to said rigid member at the end remote from said shedder;

said screw being free to rotate with respect to said rigid member, so as to accommodate easy disengagement of said rigid member from said shedder.

9. Apparatus as claimed in claim 8 further including spring means urging said rigid member against said shedder, thereby providing temperature compensation for said alignment over a preselected range.

10. Apparatus as claimed in claim 8 including means for sealing said second opening from the pressures developed by said flowing fluid.

* * * * *